Patented May 12, 1942

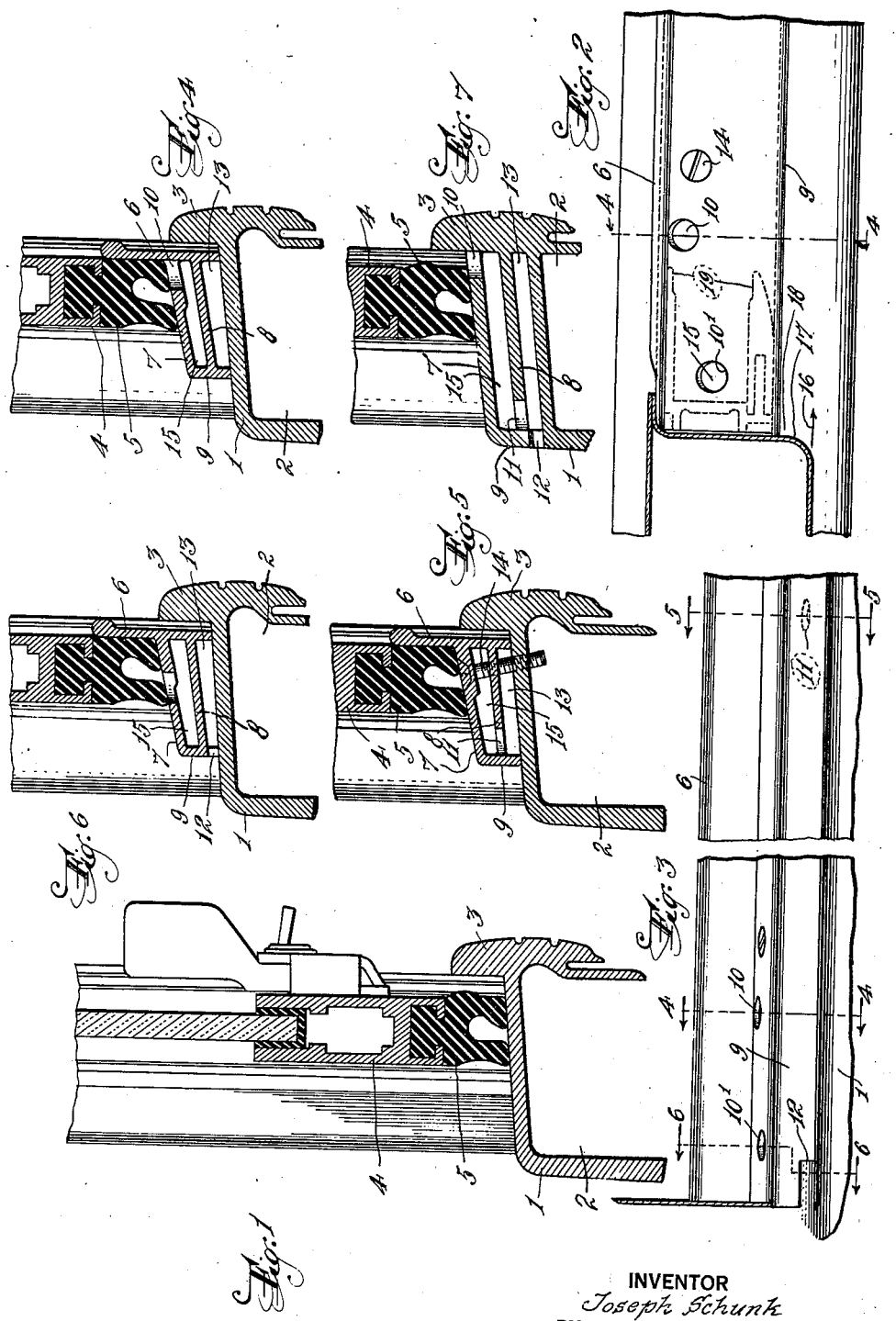

2,282,531

UNITED STATES PATENT OFFICE 2,282,531

VEHICLE WINDOW SILL CONSTRUCTION

Joseph Schunk, Newark, N. J., assignor to The National Lock Washer Company, Newark, N. J.

Application January 31, 1941, Serial No. 376,718

6 Claims. (Cl. 189—75)

This invention relates to an improved type of window sill construction especially adapted for use in vehicles such as buses and railway cars.

It may be stated in general that experience has shown, in making up window openings, that a comparatively flat sill construction is cheaper to make than one having a sloping sill, but a flat sill does not provide the proper drainage for the window sash and its runway parts, particularly when subjected to heavy rain which is forced against the window by the force of the wind and the speed of the vehicle. Furthermore, good bus or car constructions do not permit drain holes to be drilled into the sill. In addition, drainage holes placed in window parts where they touch the sill provide means for more water to be forced back of the window parts. Consequently, it is necessary to have a construction which will bring about proper drainage and avoid leaks into the vehicle.

It is therefore the principal object of my present invention to provide a sub-sill construction which will allow the use of a relatively flat sill construction and at the same time provide means to give the drainage necessary to avoid leakage over the sill into the vehicle.

My improved type of construction is depicted in the annexed drawing, wherein:

Figure 1 is a fragmentary sectional view showing the usual type of vehicle window sill construction with the window sash fitting thereon.

Figure 2 is a plan view of one end of a window sash adjacent the window post which is shown in section.

Figure 3 is a side elevation of Figure 2.

Figure 4 is a view on the lines 4—4 of Figures 2 and 3.

Figure 5 is a view on the line 5—5 of Figure 3.

Figure 6 is a view on the line 6—6 of Figure 3.

Figure 7 is a view of a window sill using my improved form of construction as an integral part with the main sill.

In Figure 1, 1 is a main sill member usually made hollow as indicated at 2 and having a window ledge 3. The sill 1 is shown with a small angle of inclination outwardly from the inside portion of the window 4 which has the usual sealing strip 5 usually of soft rubber which rests on the sill 1 when the window is in closed position. The details of the window per se need not be described, as these may vary over a wide range. Suffice it to say that with a standard type of construction, such as shown in Figure 1, when the vehicle is moving and the wind is driving in a direction opposite to the direction of motion of the vehicle, water can be and is forced under the weather strip 5 and up over the sill ledge 3 into the vehicle. This action is accelerated by the weaving action of the vehicle, particularly a bus, as it travels over the road. This weaving action tends to alternately raise the window slight at different parts along its length, allowing the water to work in under the sill as heretofore mentioned.

To prevent this action, I have discovered that the use of a sub-sill, as shown in Figures 2 to 6 inclusive, attached to the standard form of main sill 1, will prevent the water from coming into the vehicle. The sub-sill construction comprises a riser 6 which has preferably integrally attached thereto a pair of spaced strips 7 and 8 which are joined together by a closure member 9 which extends downwardly beyond the strip 8 into engagement with the main sill member 1. The upper strip 7 of the sub-sill has a plurality of drainage holes 10 positioned closely adjacent the riser 6. The weather strip 5 does not extend the entire width of the window sash, but stops just adjacent the sash guides. Consequently, the holes 10, as indicated in Figure 2, are located at a point approximately where the weather strip 5 begins, which is adjacent the window guide members 19 which are shown in dotted position in Figure 2. Additional holes 10' in the upper strip are located directly under the rack channel so as to catch the water which may be forced in or around the rack channel.

In other words, the two sides of the window, one of which is indicated in Figure 2, are the points where the largest amount of water may be driven in under the window and into the vehicle. There may be one or more intermediate holes 10 between those at the ends as just described. The lower strip 8 has one or more holes 11 which are preferably positioned toward the center of the window sill at quite a distance from the end holes 10 and 10', and these holes 11 are close to the outer edge of the strip 8. That portion of the closure member 9 at the ends and at the outer corners has notches 12 located therein to provide drainage out of the compartment 13.

As shown in Figures 2 and 5, the sub-sill assembly, where it is used as a separate part from the main window sill, is held to the main sill 1 as by a plurality of screws 14. In Figure 7 I have shown a construction in which the main and sub-sills are made as an integral structure.

However, the compartments 13 and 15 are arranged in a similar manner as in Figures 4, 5 and 6 and are provided with holes 10, 10' and 11, and notches or holes 12, the same as described with reference to these figures. In the integral construction of Figure 7, the ledge 3 and the riser 6 become one part which is in effect a riser.

The operation is the same in both types of construction; that is to say, if any water is driven in under the weather strip 5 or other parts of the window, it will find its way through the holes 10 and 10' in the upper strip 7 into the compartment 15, and due to the slight inclination of the strip 8, the water will find its way downwardly through the holes 11 into the compartment 13, and then along the main sill portion 1 out through the notches or holes 12 at the ends of the window sill. This drainage action is enhanced by a suction action produced by the speed of the vehicle forcing air in the direction of the arrow 16 of Figure 2 by the window post or frame member 17. This tends to produce a vacuum in the space or pocket 18 in front of the notched out portion 12, and hence tends to draw the water out of the enclosure chamber 13, it being understood that the enclosures 13 and 15 extend longitudinally and substantially the full length of the window sill. This supplementary action of the air stream by the openings or notches 12 is of course dependent on the speed of the vehicle and of course is more pronounced in its effect at high speed which, on the other hand, acts to force the water under the weather strip 5 and around the sash guides.

I have found, by extensive tests which I have made, that this sub-sill construction, whether made separately and added to a standard form of main window sill, or built integrally therewith, will prevent the overflow over the window sill ledge into the vehicle.

What I claim is:

1. A window sill construction comprising a main sill having a ledge along the inner part of the sill, a sub-sill extending longitudinally of the main sill and transversely from the ledge toward the outer edge of the main sill, said sub-sill including a riser, two members fastened to the riser and spaced upwardly from the main sill and from each other and closure means joining the outer edges of said two members to form a chamber therebetween and extending downwardly to the main sill, the upper of said two members having holes therethrough closely adjacent the riser, while the lower of said two members has holes through it near the edge away from the riser and a drain slot at each of the outer corners of the closure means at its juncture with the sill.

2. A window sill construction comprising a main sill having a ledge along the inner part of the sill, a sub-sill extending longitudinally of the main sill and transversely from the ledge toward the outer edge of the main sill, said sub-sill including a riser and two members fastened to the riser and spaced upwardly from the main sill and from each other and closure means joining the outer edges of said two members to form a chamber therebetween and extending downwardly to the main sill, the upper of said two members having holes therethrough closely adjacent the riser, the holes being located at least one at each end, while the lower of said two members has holes through it near the edge away from the riser, the holes being located toward the center of the sub-sill, and a drain slot at each of the outer corners of the closure means at its juncture with the sill.

3. A window sill construction comprising a main sill having a ledge along the inner part of the sill, a sub-sill extending longitudinally of the main sill and transversely from the ledge toward the outer edge of the main sill, said sub-sill including a riser and a pair of strips integral with the riser, all of suitable material arranged to form a chamber between the strips throughout the length of the sub-sill and closure means joining the outer edges of said two members to form a chamber therebetween and extending downwardly to the main sill, each strip having holes therein, the holes being in staggered relation, those in the upper strip being closely adjacent the riser, while those in the lower strip are located away from the riser, the lower strip being spaced from the main sill portion, and means at the lower outer corners of the sub-sill at its juncture with the sill to drain the space below the lower strip.

4. A window sill construction comprising a main sill having a ledge along the inner part of the sill, a sub-sill extending longitudinally of the main sill and transversely from the ledge toward the outer edge of the main sill, said sub-sill including a riser and a pair of strips extending outwardly from the riser and arranged one above the other to form the sides of an enclosure and closure means between the outer edges of said strips and extending downwardly to the main sill, each strip having holes therein, those in the upper strip being nearer the riser than the holes in the lower strip, and means located below the lower strip and at the forward outer corner of the sub-sill closure means for draining the space below the lower strip.

5. A window sill construction including a riser along the inner length of the sill, a pair of spaced strips of suitable material fastened to the riser and extending outwardly from it and closure means between the outer edges of the two strips, thereby forming a hollow sub-sill member, each strip having holes therein, the holes preferably being arranged in staggered relation with those in the upper strip being nearer the riser than the holes in the lower strip, said closure means extending below the lower strip into contact with the said sill and with the riser forming a space below the lower strip and the said sill, and means located at least at the forward outer corner of the closure means below the lower strip closely adjacent the said sill for draining the said space.

6. A window sill construction including a riser part along the inner length of the sill, a pair of spaced strips of suitable material fastened to the riser and extending outwardly from it, closure means between the outer edges of the two strips and extending downwardly below the lower of said strips, thereby forming a chamber between the two strips, a member attached to and extending from the riser part along the length of said sill and outwardly away from the riser into engagement with the lower edge of said closure means forming a closure space below the lower strip, and an opening in the corner of the closure means at least at the forward end of said sill below the lower one of the two strips and closely adjacent said member.

JOSEPH SCHUNK